Patented May 6, 1941

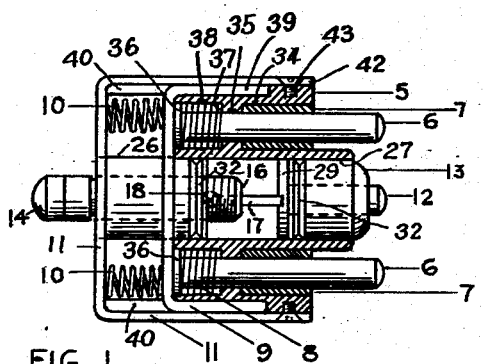
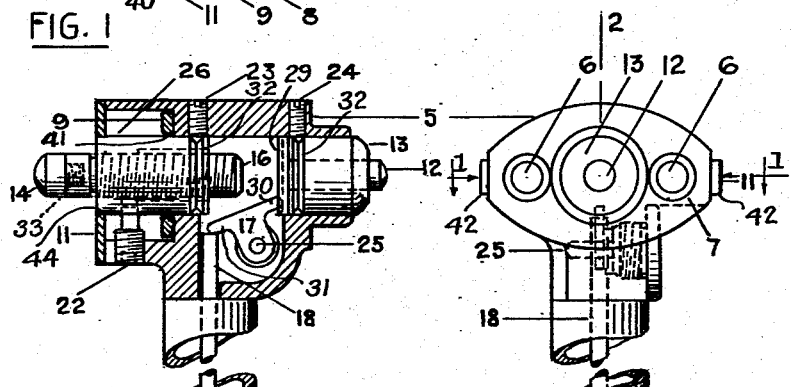
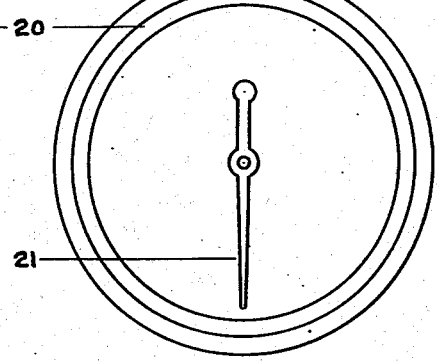

2,241,287

UNITED STATES PATENT OFFICE 2,241,287

BORE GAUGE

Valorus S. Westcott, Pawtucket, R. I., assignor to Jenckes Knitting Machine Company, Pawtucket, R. I., a corporation of Rhode Island Application July 25, 1939, Serial No. 286,467

2 Claims. (Cl. 33—178)

My invention relates to measuring gauges for checking bores for size, taper and other types of structural defects, and has among its objects and advantages the provision of an improved measuring unit adapted for association with conventional dial indicators with any type or scale of graduations, in which the construction is such as to provide an accurate reading as well as measurements of the bore at the bottom thereof.

In the accompanying drawings:

Figure 1 is a sectional view along the line 1—1 of Figure 3, with certain parts illustrated in elevation;

Figure 2 is a sectional view along the line 2—2 of Figure 3, with certain parts illustrated in elevation;

Figure 3 is an elevational view illustrating the detector head in association with a conventional dial indicator, with the head connected with the indicator by a tubular connection to permit the head to be lowered to the bottom of a bore and at the same time maintaining the indicator visible;

Figure 4:
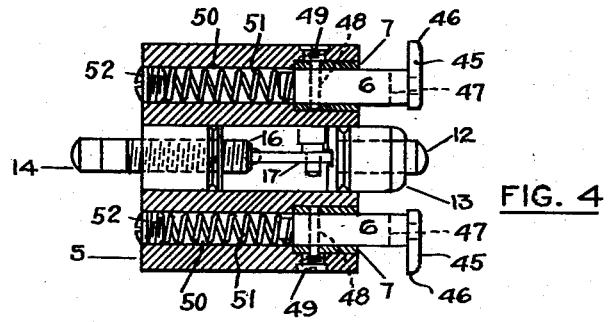
Figure 4 is a sectional view of a different form of head.

In the embodiment selected to illustrate my invention, I make use of a head 5 provided with a central bore 27 for the reception of a sleeve 13 bored to slidably receive a measuring stud 12 having a flange 29 arranged in engagement with the rounded end of a finger 30 of an actuating member 17 mounted for rotation about the pin 25. Member 17 includes a second finger 31 having a rounded end engaging one end of a sliding plunger 18 for operating the dial mechanism of the indicator 20 in the usual way. Measuring stud 12 is rounded at its outer end. Sleeve 13 is grooved at 32 for the reception of a set screw 24 which secures the sleeve against relative axial movement relatively to the bore 27.

Projecting a short distance inside the opposite end of the bore 27 is a sleeve 26 internally threaded for threaded connection with a screw 16, and the sleeve is made secure by a set screw 23 threaded into the head 5 with the inner end of the set screw extending into the circumferential groove 32. Screw 16 is internally threaded for connection with a threaded pin 33 having a stud 14 rounded at its outer end. Stud 14 is axially aligned with the measuring stud 12, the latter being movable longitudinally of the sleeve 13, but the screw 16 is stationary after being set. Screw 16 may be adjusted to provide a predetermined spacing between the studs 12 and 14 and made secure through the medium of a set screw 22 having its inner end extending through an opening in the sleeve 26.

Head 5 is bored at 34 for the reception of bushings 7 which slidably support locating studs 6 positioned on diametrically opposite sides of the measuring stud 12, with the axis of the measuring stud lying in a plane passing through the axes of the locating studs 6. Locating studs 6 extend through bores 35 in the head 5 and are flanged at 36 to provide abutments for compression springs 8 which have their opposite ends resting on the bottoms 37 of bores 38 of sufficient diameter to loosely receive the flanges 36. A plate 9 is provided with right-angular runs 39 slidable in grooves 40 in the head 5. Plate 9 is provided with a bore 41 for loosely receiving the sleeve 26, and the compression springs 8 press the flanges 36 of the locating studs 6 against the plate. A plate 11 lies against one end of the head 5 and is provided with right-angular arms 42 fixedly secured to the head by screws 43. Plate 11 is provided with a bore 44 for supporting one end of the sleeve 26. Between the plates 9 and 11, I position strong compression springs 10 which normally urge the plate 9 and the locating studs 6 to the positions of Figure 1.

In operation, the screw 16 may be adjusted to precisely position the ends of the measuring studs 12 and 14 at the required distance. The screw 16 is adjusted while observing the needle 21 of the gauge and when the spacing is attained, with the needle in proper registration, the screw 16 is made secure by the set screw 22. In the event that the adjustable range of the screw 16 is insufficient for adjusting the measuring unit to large diameter bores, a measuring stud 14 of greater length may be substituted for the one illustrated in Figure 2, thus permitting the measuring device to function in connection with a large range of diameters through mere substitution of the measuring stud 14.

When the head 5 is positioned in a bore to be measured, locating pins 6 will engage the wall of the bore and cooperate with the stud 14 for precisely locating the measuring unit at the true diametrical center of the bore. The sliding measuring stud 12 is then brought into play and will move inwardly or outwardly, depending upon structural irregularities in the bore, for actuating the member 17, which in turn actuates the plunger 18 operatively connected with the needle 21 to indicate the degree of structural irregularity in terms of whatever scale of graduation might be employed. Head 5 is connected with the indicator 20 through the medium of a tube 19 which may be of such length as to permit the head 5 to be lowered to the bottom of a bore of considerable depth so that the indicator 20 will be visible while taking measurements in relatively deep bores. While the locating studs 6 may move in unison, the studs are structurally independent with respect to the plate 9 which eliminates binding incident to measuring devices in which the locating studs are integrally connected. Thus, the measuring unit functions so as to provide precise location of the unit inside the bore to the end that accurate readings may be had to determine the exact condition of the bore.

Figure 5:
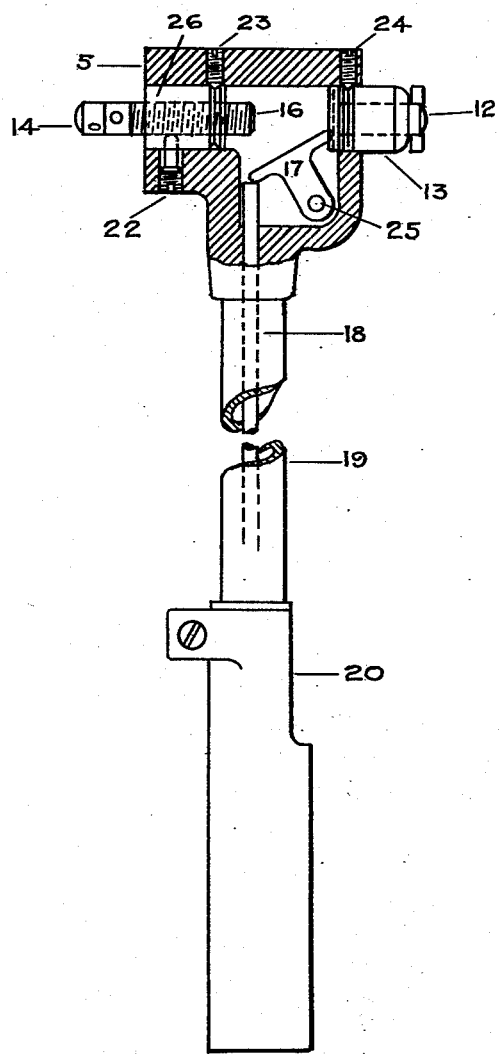
Figure 5 is a sectional view of the head of Fig. 4 illustrating the head in association with the dial indicator of Figs. 2 and 3.

Figs. 4 and 5 illustrate a slightly different form of construction in which the locating studs 6 are provided with right-angular plate elements 45 having ends 46 curved concentrically about the axis of the sliding measuring stud 12. Studs 6 are provided with transverse slots 47 through which pins 48 extend, which pins are carried by screws 49 threaded into the body 5.

The body is provided with bores 50 for the reception of compression springs 51, and the springs each has one end abutting one of the studs 6 and its other end abutting a screw plug 52 having threaded relation with its respective bore 50. Bores 50 are also provided with bushings 7 for the studs 6. In other respects, the construction of Figs. 4 and 5 is similar to that illustrated in Figs. 1, 2 and 3. Studs 6 operate against strong compression springs so as to eliminate the plate 9 illustrated in Figs. 1 and 2.

Having thus described certain embodiments of my invention in detail, it is, of course, understood that I do not desire to limit the scope thereof to the exact details set forth except in so far as those details may be defined in the appended claims.

I claim:

1. In a bore measuring device including a dial indicator mechanism actuating plunger, a head provided with grooves and bores, locating studs slidable in said bores, a plate having right angular bars slidably disposed in said grooves, with each of the locating studs independently spring-pressed against said plate, springs exerting pressure on said plate for holding the latter in engagement with said locating studs against the tension of the forces of the spring-pressed studs, a normally fixed measuring stud carried by said head, a slidable measuring stud axially aligned with said fixed measuring stud, and an operating connection between said slidable measuring stud and said actuating plunger.

2. In a bore measuring device including a dial indicator mechanism actuating plunger, a head provided with grooves and bores, locating studs slidable in said bores, a plate having right angular bars slidably disposed in said grooves, with each of the locating studs independently spring-pressed against said plate, springs exerting pressure on said plate for holding the latter in engagement with said locating studs against the tension of the forces of the spring-pressed studs, a normally fixed measuring stud carried by said head, a slidable measuring stud axially aligned with said fixed measuring stud, and an operating connection between said slidable measuring stud and said actuating plunger, and an abutment plate attached to said head for holding said springs against said plate.

VALORUS S. WESTCOTT.